Figure 1:
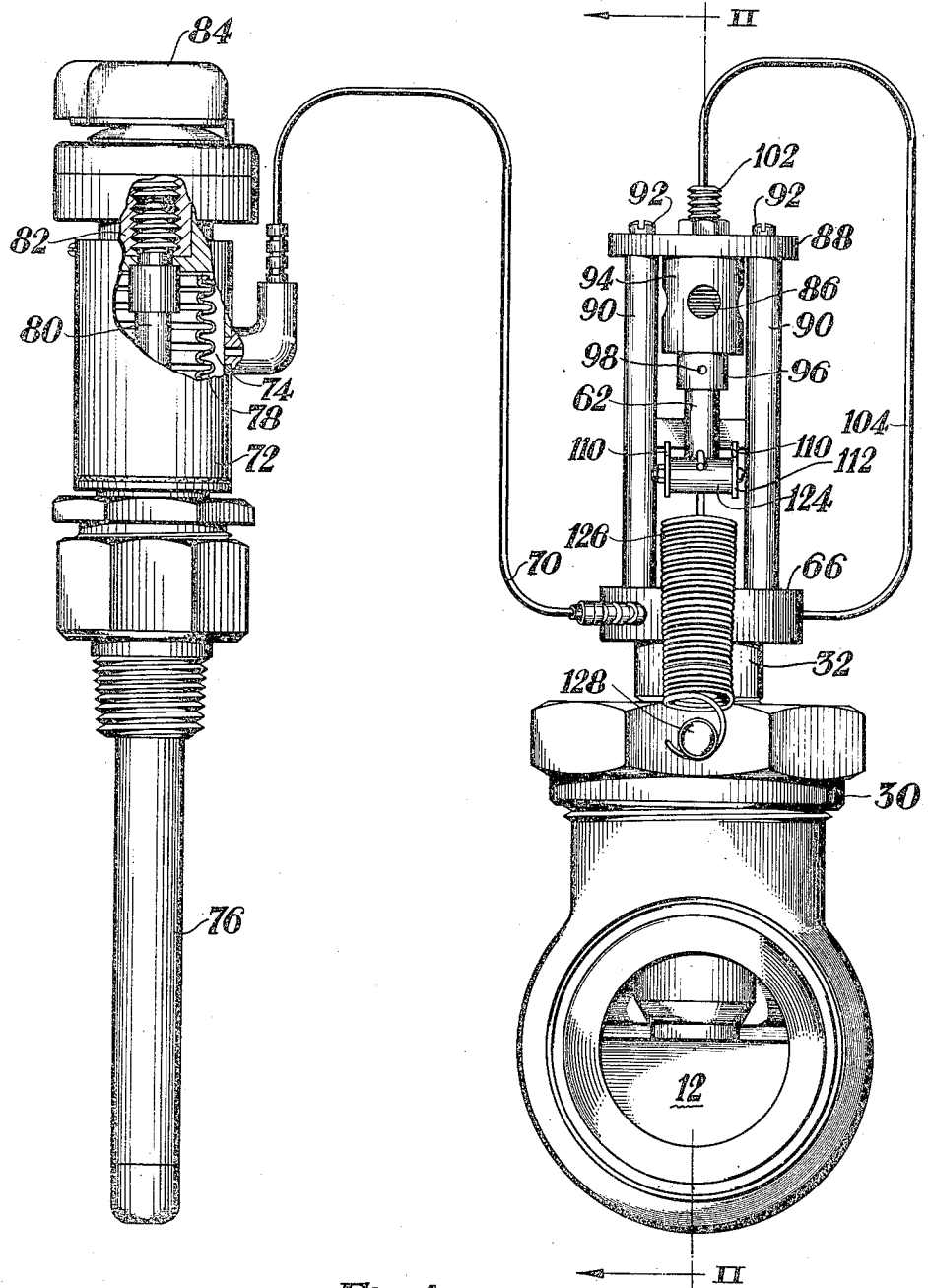

Oct. 9, 1956  L. M. PUSTER  2,765,985
THERMOSTATIC CONTROL DEVICE
Filed May 19, 1955  2 Sheets-Sheet 1

INVENTOR.
Louis M. Puster
BY
*Albert J. Henderson*
HIS ATTORNEY

INVENTOR.
Louis M. Puster

United States Patent Office 2,765,985
Patented Oct. 9, 1956

2,765,985

THERMOSTATIC CONTROL DEVICE

Louis M. Puster, Knoxville, Tenn., assignor to Robertshaw-Fulton Controls Company, Greensburg, Pa., a corporation of Delaware Application May 19, 1955, Serial No. 509,525

15 Claims. (Cl. 236—68)

This invention relates to thermostatic control devices and, more particularly, to thermostatic control devices for controlling the flow of high temperature fluids such as steam.

In presently used devices of the described type, a temperature sensing bulb of predetermined volume is connected by means of a small bored capillary tubing to an expansible chamber positioned within a casing and generally referred to as a hot chamber. The hot chamber usually comprises an expansible bellows having one end sealed to the casing, the other end being movable and operatively engaging a valve means for causing movement thereof in response to expansion of the bellows. The hot chamber, bulb and connecting capillary tube comprise a sealed system which is filled with a volatile liquid which when exposed to a high temperature fluid, such as steam, will vaporize to a superheated condition.

If, during operation, the temperature sensing bulb is cool, the bulb and the connecting capillary tube will be filled with a volatile liquid to within a short distance of the hot chamber bellows. Since the hot chamber is in contact with the steam, the volatile fluid therein and for a short distance in the connecting tube will exist in a superheated state at some pressure lower than that required to start movement of the bellows. Should the temperature of the bulb be raised, the liquid therein will expand, and a quantity of it will be forced into the hot chamber where it will vaporize. This additional quantity of charge in the hot chamber increases the pressure of the super-heated vapor therein. As the temperature of the bulb continues to increase, and more liquid is forced into the hot chamber, pressure will continue to build up until the hot chamber bellows expands sufficiently to cause closure of the valve means by movement of its movable end.

The bulb is also usually provided with an expansible chamber consisting of an adjustment bellows having fixed and movable ends and the interior thereof sealed from the volatile fluid within the bulb. The movable end of the adjustment bellows is movable by means of an adjusting stem to effectively inject or withdraw a quantity of liquid from the hot chamber to change the setting of the valve a measurable amount.

It will be apparent to those skilled in the art that the temperature differential on the bulb between the point when the hot chamber begins to move the valve means to the point when the hot chamber causes closure of the valve means is usually taken as a proportional band in such devices. It will also be apparent that the proportional band is a function of the amount of liquid which is injected into the hot chamber for a given temperature, which, in turn is a function of the bulb volume. The adjustment bellows provides a means of either injecting or withdrawing a quantity of liquid from the hot chamber to change the setting of the valve a measurable amount. However, the quantity of liquid injected or withdrawn by the adjustment bellows is small in relation to the total bulb volume. Therefore, the bulb volume and consequently the proportional band are for all practical purposes, a constant for a given control of the type just described.

It will be apparent that a narrow proportional band will cause a large change of heat input for a small departure of the temperature, and that a wide proportional band will cause a small change in heat input for a departure of the temperature. The proper width of the proportional band in such devices depends entirely on the application for which the device is to be used. Thus, a device of the described type having a constant proportional band may be entirely satisfactory for one application but unsatisfactory for another. Therefore, it is an object of this invention to incorporate in a thermostatic control device, a means for varying the proportional band in which the device will operate.

Another object of this invention is to secure a wider range of temperature settings on the adjustment of the device.

In the preferred embodiment of the device, the hot chamber hereinbefore described has added thereto, a second bellows having one end attached to the walls of the hot chamber while the other end thereof is free to move. The pressure within the hot chamber which acts to move the hot chamber bellows acts on the exterior surface of the second bellows. The second bellows is connected by means of a stem to a third bellows mounted so that one end is fixed and the other end is attached to the stem so that any motion of the second bellows is transmitted by the stem to the third bellows. The interior of the third bellows is filled with a measurable amount of the volatile fluid and connected by a capillary tube to the hot chamber. An increase in pressure of the vapor within the hot chamber causes movement of the second bellows and the stem which moves the third bellows to force a quantity of fluid from the third bellows into the hot chamber, which vaporizes and further increases the pressure tending to move the hot chamber bellows. An adjusting means is associated with the second bellows to vary movement thereof and the amount of liquid injected into the hot chamber from the third bellows.

Figure 2:
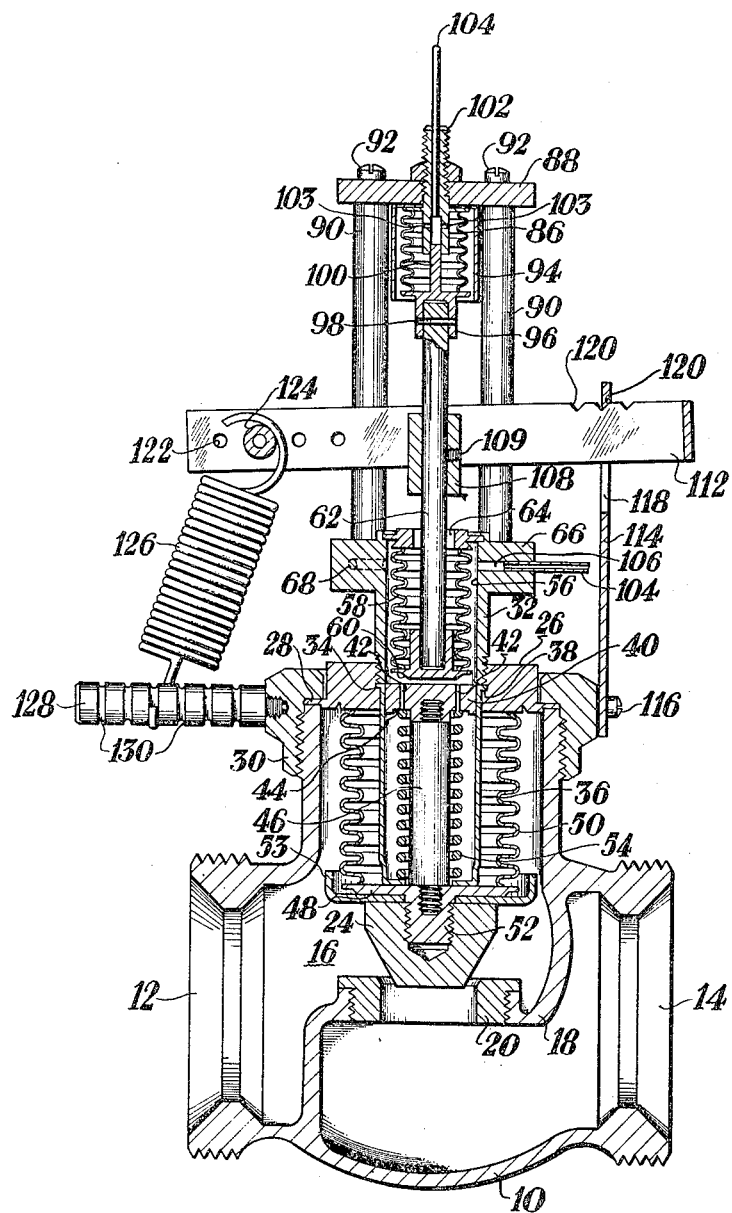

Other objects and advantages will become apparent from the following description taken in connection with the following drawings wherein:

Fig. 1 is a front-elevation, partly in section, of the control device embodying the invention; and Fig. 2 is a section taken on the line II—II of Fig. 1.

Referring more particularly to the drawings, the control device comprises a casing 10 having an inlet 12 and an outlet 14 communicating with a valve chamber 16. The inlet 12 and outlet 14 are suitably threaded to have inlet and outlet pipes connected thereto. Interiorly, the casing 10 has a partition 18 which defines a valve chamber 16 and is provided with a removable valve seat ring 20. A valve member 24 is positioned within the valve chamber 16 and is reciprocable into and out of engagement with the seat 20 to control the flow of fluid from the inlet 12 to the outlet 14.

A sealing cap 26 having a flanged end 28 is fixed to the upper end of the casing 10 by a bonnet 30 suitably threaded on the end of the casing 10. A bushing 32 is suitably threaded within the cap 26 and fixes a flanged end 34 of a spring cup 36 to a shoulder 38 of the disk 26. The other end of the cup 36 extends toward the valve 24 to be axially aligned therewith.

A disk 40 is slidably mounted within the spring cup 36 and provided with two ports 42, 42 and a recess 44. One end of a guide stem 46 is threaded within the disk 40, the other end thereof extending through a hole in the end of the spring cup 36 to be threaded within a movable end 48 of a flexible bellows 50 which will hereafter be referred to as the hot chamber bellows. The bellows 50 encloses the spring cup 36 and guide stem 46 and has the other end fixed to the cap 26 to seal the interior thereof from the valve chamber 16. The movable end 48 of the bellows 50 is provided with an axial stud 52 which is threaded within the valve member 24. A washer 53 is positioned between the movable end 48 and the valve member 24 and serves to shield the bellows 50 and prevent damage to the movable end 48 during assembly and handling.

A coil spring 54 encircles the guide stem 46 and is mounted in compression between the disk 40 and the other end of the spring cup 36. One end of the spring 54 is seated in the recess 44, the other end thereof engaging the end of the spring cup 36. It can be seen that the spring 54 biases the assembly of the disk 40, guide stem 46, movable end 48 and valve 24 away from the valve seat 20, and thus, the valve member 24 to an open position as shown. Should a fluid, later to be described, within the bellows 50, expand in response to a change in state, it will be necessary for the pressure thus created to overcome the force of the spring 54 before the movable end 48 will cause movement of the valve 24.

The bushing 32 projects from the cap 26 and is provided with a cylindrical bore 56 which is axially aligned with the hot chamber bellows 50 and guide stem 46. The ports 42, 42 establish communication between the bore 56 and the interior of the bellows 50. A second bellows 58 which may be referred to as a power bellows, is positioned within the bore 56 and has one end fixed to the upper end of the bore 56, the other end 60 thereof being movable and facing the disk 40. An operating stem 62 extends through an opening 64 in the upper end of the bushing 32 to be attached to the movable end 60 and axially aligned with the power bellows 58 and hot chamber bellows 50.

The interior of the power bellows 58 is sealed from the bore 56, but the pressure within the bore 56 will act upon it to cause movement of the movable end 60 in response to a condition later to be described. The other end of the stem 62 projects from the bushing 32 to be attached to a system also later to be described.

A collar 66 is formed on the projecting end of the bushing 32 and is provided with a lateral passage 68 which opens into the bore 56. A capillary tube 70 of any suitable type is connected at one end to the passage 68 by a suitable fitting and projects from the collar 66 to have the other end attached by a suitable fitting to a casing 72 of a temperature sensing unit for communication with a bore 74 within the casing 72 of the temperature sensing unit. The bore 74 is in communication with a temperature sensing bulb 76 which may be of any suitable type. The capillary tube 70 thus establishes communication between the bulb 76 and the bellows 50.

A customary adjustment bellows 78 is positioned within the bore 74 and is fixed to the upper end thereof to seal the interior of the bellows 78 from the bore 74, the other end of the bellows 78 being movable by means of an adjustment stem 80 having one end in engagement therewith. The adjustment stem 80 has a portion threaded in a bushing 82 and a portion projecting from the casing 72 to receive a manually operable knob 84, rotation of which serves to expand or contract the bellows 78 to vary the volume of the liquid within the bore 74. Temperature sensing units of the described type are well known in the art and further description is deemed unnecessary.

To the device thus far described, a novel means, which includes the bellows 58 and stem 62, is added to enable the proportional band of the device to be varied. It can be seen that a pressure within the hot chamber bellows 50, in addition to acting on the movable end 48, also acts upon the movable end 60 of the power bellows 58 tending to contract the bellows 58 and cause axial movement upward of the stem 62. The bellows 50 is connected by means of the stem 62 to a third bellows 86 which may be referred to as a reservoir bellows. One end of the reservoir bellows 86 is fixed to a plate 88 which is suitably spaced from the collar 66 by a plurality of equally spaced rods 90, each of which has one end fixed to the collar 66 and the other end fixed to the plate 88 by a screw 92. The rods 90 are of such length that heat transfer to the reservoir bellows 86 from the hot chamber bellows 50 and its components is negligible.

A tubular guide 94 which has one end attached to the plate 88 encloses the bellows 86 and maintains axial alignment thereof with the bellows 50. A thrust member 96 is attached to the free end of the bellows 86 and is provided with a tubular end portion which has the end of the stem 62 fixed therein by a pin 98. A pintle 100 is formed on the opposite end of the thrust member 96 and extends into the bellows 86 to be slidably received by a bushing 102 threaded through the plate 88. Two ports 103, 103 extending laterally through the side wall of the bushing 102 and diametrically opposite each other serve to establish communication between the interior of the bellows 86 and the interior of the bushing 102. A capillary tube 104 extends between the bushing 102 and a passage 106 in the collar 66 opposite the passage 68 therein to establish communication between the interior of the bellows 86 and the bore 56 in the bushing 32.

The bellows 86 is also filled with the volatile fluid hereinbefore described, but because of its distance from the bellows 58, the fluid therein will be in a liquid state. The size of bellows 58 is selected so that its effective area is larger than the effective area of the reservoir bellows 86 for a purpose now to be described.

The pressure of the super-heated fluid within the bellows 50 will act upon the bellows 58 to cause axial movement of the stem 62 toward the reservoir bellows 86. The bellows 86 having a smaller effective area than the bellows 58 will contract under the force of the stem 62 to force a quantity of fluid from the tube 104 into the bore 56 which immediately vaporizes and further increases the pressure within the hot chamber bellows 50. This causes further movement of the valve 24 than would be normally attained by the vaporization of the fluid injected into the hot chamber bellows 50 by the bulb 76 alone. The increase in pressure due to the vaporization of the fluid received from the reservoir bellows 86 will cause further movement of the power bellows 58 and further injection of fluid into the hot chamber bellows 50 by the reservoir bellows 86 unless movement of the bellows 58 is limited.

To this end, bushing 108 is slidably mounted on the stem 62 and fixed thereto by a set screw 109. The bushing 108 is provided with two pivots 110, 110 (Fig. 1) which support a lever 112 positioned substantially normal to the axis defined by the four rods 90 and extending therebeyond. A support plate 114 having one end fixed to the cap 30 by a screw 116 extends from the cap 30 to define a fulcrum for the lever 112. The lever 112 extends through an enlarged slot 118 in the support plate 114 and is provided with a plurality of notches 120 which are selectively engageable with one edge of the slot 118. The other end of the lever 112 is provided with a plurality of holes 122 which are adapted selectively to receive a pin 124. A coil spring 126 has one end hooked over the pin 124 and the other end hooked on a rod 128 suitably threaded in the cap 30 and extending laterally therefrom. The rod 128 is provided with a plurality of grooves 130 which enable the position of the spring 126 to be varied.

The set screw 109 enables the position of the bushing 108 on the stem 62 to be varied to thus vary the tension of the spring 126 which effectively biases the stem 62 towards the hot chamber bellows 50 and opposes the pressure within the hot chamber bellows 50 tending to move the stem 62 toward the reservoir bellows 86. As the stem 62 moves toward the reservoir bellows 86, the bushing 108 will be carried with it to cause clockwise pivoting of the lever 112 about one of the notches 120. This will cause upward movement of the pin 124 to elongate the spring 126 and increase the force exerted thereby on the stem 62. Thus, the force of the spring 126 opposing the pressure within the bellows 50 will increase upon movement of the stem 62 toward the bellows 86. It can now be seen that a point of equilibrium will be reached to limit movement of the stem 62.

The notches 120 enable the pivoting point of the lever 112 to be varied to vary the rate of increase in the tension of the spring 126 with movement of the stem 62. By varying the rate of increase in the tension of the spring 126, the equilibrium position of the stem 62 will be effectively varied. Since the amount of liquid injected into the hot chamber bellows 50 by the reservoir bellows 86 depends upon the upward movement of the stem 62, it can also be seen that the movement of the valve member 24 will also be varied by varying the pivoting point of the lever 112. Since the amount of fluid injected into the hot chamber bellows 50 by the reservoir bellows 86 determines the amount of valve movement, the proportional band of the device will also be varied by varying the position of the fulcrum of the lever 112.

Operation

The system of bulb 76, bore 74, capillary tubing 70, hot chamber bellows 50, bore 56, reservoir bellows 86, and capillary tubing 104 is filled with the proper amount of volatile fluid. Assuming now that the bulb 76 is cool and that the flow of steam through casing inlet 12 and outlet 14 is being controlled by the valve member 24 in the position shown in Fig. 2, it can readily be seen that the steam will surround the hot chamber bellows 50 and that the hot chamber bellows 50, the bore 56 and a portion of the tubes 70 and 104 near the bore 56 will be filled with superheated vapors at some pressure $P_1$ while the bulb 76, bore 74, reservoir bellows 86, tube 104, and tube 70 will be filled with a liquid. The pressure $P_1$, while being lower than that necessary to start movement of the hot chamber bellows 50, acts on the effective area of the power bellows 58 in an upward direction and on the reservoir bellows 86 in a downward direction so that there is a net force upward of the pressure $P_1$ multiplied by the difference between the effective areas of the bellows 56 and reservoir bellows 86. This force is counterbalanced partially by a force due to the spring rate of the two bellows and partially by the force exerted by the tension spring 126 acting on the pivots 110, 110 attached to the stem 62 by the bushing 108. Thus, as shown in Fig. 2, the system is in balance with both the valve member 24 and the hot chamber bellows 50 in the wide open position.

If the temperature on the bulb 76 increases, a quantity of the liquid therein will be forced from the capillary tube 70 into the hot chamber bellows 50 due to the cubical expansion of the liquid within the bulb 76. This additional quantity of liquid forced into the hot chamber bellows 50 from the bulb 76 vaporizes and increases the pressure in the hot chamber bellows 50 to some value $P_2$. This increased pressure $P_2$ in the hot chamber bellows 50 acts on the unbalance between the effective areas of the power bellows 58 and the reservoir bellows 86.

Since the system was in balance under the lower pressure $P_1$, the increased pressure $P_2$ will result in upward movement of the power bellows 58 which will be transmitted to the reservoir bellows 86 through the stem 62. Because reservoir bellows 86 is filled with a liquid as previously described, upward movement of power bellows 58 compresses the bellows 86 and forces some of the liquid out of the bellows 86, through capillary tube 104 into the hot chamber bellows 50. This additional quantity of liquid causes a further increase of pressure in the hot chamber bellows 50 to a value $P_3$. This increased pressure $P_3$ will in turn act upwardly on the unbalance between the effective areas of bellows 58 and 86 and produce another increased pressure $P_4$ within hot chamber bellows 50, each increase in pressure producing another increase in pressure and always moving valve member 24 downwardly towards engagement with its seat. Thus, by using the power bellows 58 and the extra reservoir of fluid in bellows 86, it can readily be seen that the proportional band of the device has been greatly reduced; that is, the movement of the valve member 24 corresponding to a given change of temperature of bulb 76 has been greatly increased.

It is apparent that the action of the invention produces cumulative pressure changes since further increase in pressure within the hot chamber bellows 50 causes further strokes of power bellows 58 and reservoir bellows 86 thus injecting more liquid into the hot chamber bellows 50 to increase the pressure even more. However, as power bellows 58 and stem 62 moves upwardly, the pivots 110, 110 are also moved upwardly by the stem 62. This motion is multiplied at the pin 124 at the end of the lever 112 resulting in a net increase in the force exerted by the spring 126 in a downward direction.

There is also an increase in the downward force due to the stroke of the bellows 58, 86. Thus, the stroke of power bellows 58 and reservoir bellows 86 with the resultant injection of liquid into the hot chamber bellows 50 will continue only to the point where the upward force due to the increase in pressure acting on the unbalanced areas between the power bellows 58 and the reservoir bellows 86 is once more balanced by the increased downward force from spring 126 and the force due to the spring rate on the bellows 58 and the bellows 86.

If the temperature on the bulb 76 decreases, the reverse process is followed. If the bulb temperature is warm enough, the hot chamber bellows 50 will be extended enough to have the valve 24 closed. When the temperature on the bulb 76 is lowered, a quantity of liquid will be withdrawn from capillary tube 70 into the bulb 76, moving the liquid in the capillary tube 70 further away from the hot chamber bellows 50. Some of the superheated vapors will then condense in the tube 70, lowering the pressure inside the hot chamber bellows 50. With lower pressure acting upward on the unbalanced area between power bellows 58 and reservoir bellows 86, the force from the spring 126 will cause the bellows 58 and the bellows 86 to move in a downward direction, thus withdrawing more superheated vapor from the hot chamber bellows 50 to condense and reduce the hot chamber pressure even more. Again the process will continue until there is a balance between the forces of the spring 126 and the pressure within the hot chamber bellows 50 acting on the unbalanced areas of the bellows 58, 86.

The extent to which the power bellows 58 and reservoir bellows 86 move as a result of a pressure change inside the hot chamber bellows 50, is a matter of selection of proper rates of the spring 126. It is possible to secure considerable variation in the spring rates by varying the fulcrum point of the lever 112 on the support 114. This also varies the proportional band of the device to accomplish one of the main objects of the invention.

It is also to be noted that with a reduction in the volume of fluid in bulb 76, it is possible to secure a wider range of temperature settings by rotation of the dial 84 than previously obtained. With a reduction in bulb volume, it is possible to secure a wider range of temperature settings on the adjustment of the regulator dial 84 since the adjustment range is an inverse function of the bulb volume.

It will be apparent that various changes may be made in the form and arrangement of parts and in the details of construction herein disclosed within the scope of the appended claims without departing from the scope of the invention.

It is claimed and desired to secure by Letters Patent:

1. In a thermostatic control device, the combination comprising a casing having an inlet and an outlet for fluid therein, a valve member disposed within said casing and movable between a plurality of controlling positions to control the flow of fluid therethrough, first flexible means associated with said valve member and operable to move said valve member between said controlling positions in response to changes in pressure within said first flexible means, thermally responsive means containing a fluid capable of volumetric changes in response to changes in a temperature condition, means connecting said thermally responsive means and said flexible means for passage of fluid therebetween in response to changes in the temperature of said thermally responsive means, said passage of fluid being accompanied by a change in pressure within said first flexible means for producing a movement of said valve member proportional to the change in temperature of said thermally responsive means, second flexible means adjacent said first flexible means and movable in response to pressure changes within said first flexible means, third flexible means containing a fluid capable of volumetric changes in response to changes in a temperature condition, means operatively connecting said second and third flexible means for simultaneous movement in response to movement of said second flexible means, and means connecting said third and first flexible means for passage of fluid therebetween in response to changes in pressure within said first flexible means.

2. In a thermostatic control device, the combination comprising a casing having an inlet and an outlet for fluid therein, a valve member disposed within said casing and movable between a plurality of controlling positions to control the flow of fluid therethrough, first flexible means associated with said valve member and operable to move said valve member between said controlling positions in response to changes in pressure within said first flexible means, thermally responsive means containing a fluid capable of volumetric changes in response to changes in a temperature condition, means connecting said thermally responsive means and said first flexible means for passage of fluid therebetween in response to changes in temperature of said thermally responsive means, said passage of fluid being accompanied by a change in pressure within said first flexible means for producing a movement of said valve member proportional to the change in temperature of said thermally responsive means, second flexible means adjacent said first flexible means and movable in response to pressure changes within said first flexible means, third flexible means containing a fluid capable of volumetric changes in response to changes in a temperature condition, means operatively connecting said second and third flexible means for simultaneous movement in response to movement of said second flexible means, means connecting said third and first flexible means for passage of fluid therebetween in response to changes in pressure within said first flexible means, and means associated with said means operatively connecting said second and third flexible means for limiting movement of said second and third flexible means.

3. In a thermostatic control device, the combination comprising a casing having an inlet and an outlet for fluid therein, a valve member disposed within said casing and movable between a plurality of controlling positions to control the flow of fluid therethrough, first flexible means associated with said valve member and operable to move said valve member between said controlling positions in response to changes in pressure within said first flexible means, thermally responsive means containing a fluid capable of volumetric changes in response to changes in a temperature condition, means connecting said thermally responsive means and said first flexible means for passage of fluid therebetween in response to changes in temperature of said thermally responsive means, said passage of fluid being accompanied by a change in pressure in said first flexible means for producing a movement of said valve member proportional to the change in temperature of said thermally responsive means, second flexible means adjacent said first flexible means and movable in response to pressure changes within said first flexible means, third flexible means containing a fluid capable of volumetric changes in response to changes in a temperature condition, means operatively connecting said second and third flexible means for simultaneous movement in response to movement of said second flexible means, and means connecting said third and first flexible means for passage of fluid therebetween in response to movement of said third flexible means, said passage of fluid between said third and first flexible means producing cumulative pressure changes within said first flexible means and incremental movement of said valve member between said controlling positions.

4. In a thermostatic control device, the combination comprising a casing having an inlet and an outlet for fluid therein, a valve member disposed within said casing and movable between a plurality of controlling positions to control the flow of fluid therethrough, first flexible means associated with said valve member and operable to move said valve member between said controlling positions in response to changes in pressure within said first flexible means, thermally responsive means containing a fluid capable of volumetric changes in response to changes in a temperature condition, means connecting said thermally responsive means and said first flexible means for passage of fluid therebetween in response to changes in temperature of said thermally responsive means, said passage of fluid being accompanied by a change in pressure in said first flexible means for producing a movement of said valve member proportional to the change in temperature of said thermally responsive means, second flexible means adjacent said first flexible means and movable in response to pressure changes within said first flexible means, third flexible means containing a fluid capable of volumetric changes in response to changes in a temperature condition, means operatively connecting said second and third flexible means for simultaneous movement in response to movement of said second flexible means, and means connecting said third and first flexible means for passage of fluid therebetween in response to movement of said third flexible means, said passage of fluid between said third and first flexible means producing cumulative pressure changes within said first flexible means and incremental movement of said valve member between said controlling positions, and means associated with said means operatively connecting said second and third flexible means for limiting movement of said second and third flexible means.

5. In a thermostatic control device as claimed in claim 4 wherein said means associated with said means operatively connecting said second and third flexible means for limiting the movement of said second and third flexible means comprises a fixed fulcrum, a pivotal lever and a spring attached to said pivotal lever, said spring capable of being placed in a plurality of positions to selectively vary the force exerted by said lever on said operative connection between said second and third flexible means.

6. In a thermostatic control device as claimed in claim 4 wherein said second flexible means has a larger effective area than said third flexible means.

7. In a thermostatic control device as claimed in claim 4 wherein said thermally responsive means is provided with a means to vary the volume of fluid therein whereby the proportional movement of said valve member in response to a predetermined temperature change of said thermally responsive means may be selectively varied.

8. In a thermostatic control device, the combination comprising a casing having an inlet and an outlet for fluid therein, a valve member disposed within said casing and movable between a plurality of controlling positions to control the flow of fluid therethrough, first flexible means associated with said valve member and operable to move said valve member between said controlling positions in response to changes in pressure within said first flexible means, thermally responsive means containing a fluid capable of volumetric changes in response to changes in a temperature condition, means connecting said thermally responsive means and said first flexible means for passage of fluid therebetween in response to changes in temperature of said thermally responsive means, said passage of fluid being accompanied by a change in pressure within said first flexible means for producing movement of said valve member proportional to the change in temperature of said thermally responsive means, second flexible means adjacent said first flexible means and movable in response to pressure changes within said first flexible means, third flexible means containing a fluid capable of volumetric changes in response to changes in a temperature condition, means operatively connecting said second and third flexible means for simultaneous movement in response to movement of said second flexible means, and means connecting said third and first flexible means for passage of fluid therebetween in response to movement of said third flexible means whereby said passage of fluid between said third and first flexible means produces cumulative pressure changes within said first flexible means and incremental movement of said valve member beyond said proportional range of movement.

9. In a thermostatic control device as claimed in claim 8 wherein said operative connection between said second and third flexible means is associated with means to limit the movement of said operative connection between said second and third flexible means in one direction to define one of said controlling positions of said valve member.

10. In a thermostatic control device as claimed in claim 9 wherein said means associated with said operative connection between said second and third flexible means comprises a fulcrum mounted on said casing, a lever pivotally and adjustably carried by said operative connection and a spring associated with said lever, said spring capable of being placed in a plurality of positions to selectively vary the force of said lever on said operative connection between said second and third flexible means.

11. In a thermostatic control device as claimed in claim 8 wherein said second flexible means has a larger effective area than said third flexible means.

12. In a thermostatic control device as claimed in claim 8 wherein said thermally responsive means is provided with a means to vary the volume of fluid therein whereby the proportional movement of said valve member in response to a predetermined temperature change of said thermally responsive means may be selectively varied.

13. In a thermostatic control device, the combination of valve means including a valve seat, a valve member movable between controlling positions relative to said seat for controlling a flow of fluid, a first expansible and contractable element positioned in said fluid flow and operatively associated with said valve member to move said valve member between said controlling positions, thermally responsive means including a fluid capable of changes in volume in response to changes in a temperature condition, conduit means interconnecting said thermally responsive means and said first expansible and contractable element for passage of fluid therebetween in response to changes in a temperature condition, said fluid vaporizing in said first expansible and contractable element and changing the pressure therein to produce a movement of said valve member proportional to a predetermined increment of temperature variation of said thermally responsive means, a second expansible and contractable element juxtaposed said first expansible and contractable element and movable in response to changes in pressure within said first expansible and contractable element, a third expansible and contractable element containing a fluid capable of changes in volume in response to changes in a temperature condition, conduit means interconnecting said third expansible and contractable element and said first expansible and contractable element, and means operatively connecting said second expansible and contractable element and said third expansible and contractable element for simultaneous movement whereby a change in pressure within said first expansible and contractable element is transmitted to said third expansible and contractable element and accompanied by a passage of fluid between said third and first expansible and contractable elements, said fluid vaporizing within said first expansible and contractable element and incrementally increasing the movement of said valve member beyond said proportional range of movement of said valve member in response to said incremental temperature change of said thermally responsive means.

14. In a thermostatic control device as claimed in claim 13, wherein said second expansible and contractable element has a larger effective area than said third expansible and contractable element.

15. In a thermostatic control device as claimed in claim 13 wherein said thermally responsive means is provided with a means to vary the volume of fluid therein whereby the proportional movement of said valve member in response to a predetermined temperature change of said thermally responsive means may be selectively varied.

References Cited in the file of this patent

UNITED STATES PATENTS

| | | |
|---|---|---|
| 1,129,433 | Stratton | Feb. 23, 1915 |
| 1,556,639 | Sheer | Oct. 13, 1925 |
| 2,290,153 | Barnes | July 21, 1942 |